Patented Apr. 30, 1929.

1,711,153

UNITED STATES PATENT OFFICE.

CHARLES V. McINTIRE, OF EAST ORANGE, NEW JERSEY, ASSIGNOR TO CONSOLIDATION COAL PRODUCTS COMPANY, OF WILMINGTON, DELAWARE, A CORPORATION OF DELAWARE.

ORE-DUST TREATMENT.

No Drawing. Application filed July 6, 1925. Serial No. 41,882.

The general object of the present invention is to provide a novel and effective method of utilizing the ore dust produced as an incident to the treatment of ores, and particularly iron ores in blast furnaces, and heretofore wasted in whole or in large part.

In ordinary blast furnace operation the outgoing gases from the blast furnace carry with them a substantial portion of the ore charged into the furnace. The ore thus carried out of the blast furnace by entrainment in the waste gases is for the most part in the form of a fine dust, much of which will pass through a screen of 100 mesh and some of which will pass through a still finer screen. In quantity the ore dust thus carried out of the furnace ordinarily approximates 5% or so of the total blast furnace ore charge. Numerous processes, usually involving a sintering or briquetting step, have been proposed in the past for the recovery of the ore content of blast furnace flue dust, but none of them have been sufficiently successful in practice to come into general use, and at the present time there are many iron and steel plants which have large stocks of unreclaimed flue dust on hand.

I have discovered that it is commercially feasible and advantageous to recover the ferrous content of blast furnace flue dust by mixing the dust with a suitable amount of volatile coal, and heating the mixture in a retort to convert the coal in the mixture into semi-coke and stirring the mixture as the coal melts to agglomerate the ore dust and semi-coke into pellets or bodies which can be effectively utilized as a part of a blast furnace ore and fuel charge. In proceeding in this manner the maximum temperature given to the coal and dust mixture will ordinarily be in the neighborhood of 800° F. though the treatment is advantageously carried out in a retort having metal heating walls which may attain a temperature of 1200° F. or so. As the mixture is heated up and the coal melts, the agitation to which the mixture is subjected causes the melted coal to surround the ore dust particles and unite with the latter in the form of pellet-like agglomerates of fused material resembling semi-coke in structure and appearance.

The described treatment may be carried out in apparatus suitable for use in the so-called low temperature distillation or carbonization of coal resulting in the production of semi-coke, and in particular may advantageously be carried out in retort furnaces constructed and having charge stirring, feeding and discharging provisions of the character illustrated in my prior Patents No. 1,457,083 of May 29, 1923, and No. 1,479,827 of January 8, 1924.

When the coal and flue dust mixture is treated in the manner described in retorts of the character illustrated in my above mentioned prior patents, the pellets discharged from the retort range in size from something like two inches in diameter down to dust-like particles, but the amount of dust particles coming out of the retort which are fine enough to pass a screen of 100 mesh, is ordinarily not more than 7% to 25% of the total amount of the mixture charged into the retort. The larger pellets or agglomerated bodies of dust and semi-coke thus produced are suitable for use in a blast furnace as a part of the ore and fuel charge for the latter. At the relatively low temperature at which the dust and coal mixture is treated, the ore, which ordinarily is wholly or mainly in the form of iron oxide or oxides, is not chemically affected. When the coal melts in the carbonization process, the resultant liquids formed not only surround, but seem to actually enter into particles of dust or ore, thus insuring an intimate contact between the ore and the semi-coke which facilitates the reduction of the ore when the product formed is subsequently passed into the blast furnace. The dust issuing from the treatment retort may be separated from the pellets large enough to be charged into a blast furnace, and again mixed with coal and re-treated in the retort with a corresponding conversion of the major portion of the dust into pellets or bodies suitable for use as a part of a blast furnace charge. In carrying out my improved process I consider it ordinarily desirable to use a smaller weight of coal than of flue dust in the mixture. The coal used will ordinarily be crushed to the fineness commonly employed in forming semi-coke.

In treating a mixture of coal and ore containing flue dust in accordance with the present invention, about the same yield of valuable volatile by-products are obtained as would be obtained by treating the coal alone for the production of semi-coke. For example, with a suitable coal containing, say, 36% of volatile matter, for each ton of coal in the mixture treated, the process can be expected to yield about 3000 feet of gas of from 850 to 950 B. t. u. value, 27 to 32 gallons of low temperature distillation tar, 1½ to 2 gallons of light oils, and a small amount of ammonia per ton of coal. Of course, the volatile by-product yield depends upon the character of the coal, and particularly on its volatile content. The coal used may be any high volatile coal suitable for low temperature carbonization, and in general the volatile content of the coal may range from something like 25% to something like 45%. The presence of the metal in the mixture treated seems to increase the rate of heat transfer to the charge from the retort heating surfaces and thereby hastens the coking reaction and increases the retort furnace capacity.

The described method of treating flue dust may be also used to treat any ore dust screened out of the ore which is to be charged into a blast furnace, with a corresponding recovery of the metal content in the ore dust, and a reduction of the amount of ore carried out of the blast furnace in the form of flue dust. The ore dust initially separated from the ore and the blast furnace flue dust may be treated together or separately in the low temperature distillation retort.

Having now described my invention, what I claim as new and desire to secure by Letters Patent, is:

1. The method of preparing ore dust for treatment in a blast furnace, which consists in mixing the dust with coal, and heating and agitating the mixture in a retort to form agglomerates of ore dust and semi-coke.

2. The method of treating blast furnace flue dust, which consists in mixing the dust with coal, heating the mixture to convert the coal into semi-coke, and agitating the mixture as it heats to thereby form agglomerates of ore dust and semi-coke.

3. In the operation of a blast furnace, the method which consists in separating dust from the ore to be charged into the furnace, mixing the dust with coal, and heating and agitating the mixture in a retort to form agglomerates of ore dust and semi-coke.

4. In the operation of a blast furnace, the method which consists in separating dust from the ore to be charged into the furnace, collecting the flue dust discharged from the furnace, mixing the dust so separated and collected with coal, and heating and agitating the mixture in a retort to form agglomerates of ore dust and semi-coke.

5. The method of preparing ore dust for treatment in a blast furnace which consists in mixing the dust with coal, heating the mixture in a retort to the temperature required to convert the coal into semi-coke, and agitating the mixture as it heats to convert much of the mixture into agglomerated bodies of ore dust and semi-coke adapted to form part of a blast furnace charge, separating such bodies from the unagglomerated ore dust, mixing coal with the latter and subjecting the mixture to the same treatment as was given to the first mentioned mixture.

Signed at Fairmont, in the county of Marion and State of West Virginia, this 2nd day of July, A. D. 1925.

CHARLES V. McINTIRE.